(12) United States Patent
Baert et al.

(10) Patent No.: US 11,391,049 B2
(45) Date of Patent: Jul. 19, 2022

(54) PANEL AND METHOD OF PRODUCING SUCH A PANEL

(71) Applicant: Champion Link International Corporation, The Valley (AI)

(72) Inventors: Thomas Luc Martine Baert, Sint-Martens-Latem (BE); Tom Van Poyer, Jiaxing Zhejiang (CN); Sven Boon, Jiaxing Zhejiang (CN)

(73) Assignee: Champion Link International Corporation

( * ) Notice: Subject to any disclaimer, the term of this patent is extended or adjusted under 35 U.S.C. 154(b) by 5 days.

(21) Appl. No.: 16/778,349

(22) Filed: Jan. 31, 2020

(65) Prior Publication Data

US 2021/0238862 A1  Aug. 5, 2021

(51) Int. Cl.
*E04B 2/00* (2006.01)
*E04F 13/08* (2006.01)
(Continued)

(52) U.S. Cl.
CPC ............ *E04F 13/0894* (2013.01); *B32B 3/06* (2013.01); *B32B 7/04* (2013.01); *B32B 13/02* (2013.01); *E04F 13/14* (2013.01); *E04F 15/02038* (2013.01); *E04F 15/08* (2013.01); *B32B 2260/00* (2013.01); *B32B 2260/021* (2013.01); *B32B 2262/101* (2013.01); *B32B 2318/00* (2013.01); *B32B 2419/04* (2013.01);
(Continued)

(58) Field of Classification Search
CPC ..... E04F 15/02038; E04F 15/12; E04F 15/02; E04F 2201/023; E04F 15/02033; E04F 15/107; E04F 15/102; E04F 2201/0107; E04F 2201/03; E04F 2201/0552; E04F 2201/0547; E04F 2201/0153; E04F 2201/0138; E04F 2201/042; F16B 5/0012; B29B 17/0042; B29B 17/00; B29B 17/02
USPC ..... 52/588.1, 592.1, 591.1, 415, 578, 592.3, 52/592.2, 309.1, 309.3; 156/279, 307.4; 428/159, 171
See application file for complete search history.

(56) References Cited

U.S. PATENT DOCUMENTS 2,944,291 A   10/1957   Prior et al.
3,421,597 A   9/1965   Hans
(Continued)

FOREIGN PATENT DOCUMENTS

CN   100419019   2/2007
DE   102012000468 A1   7/2013
(Continued)

OTHER PUBLICATIONS

International Search Report and Written Opinion of Corresponding App. No. NL2024806 dated Nov. 26, 2020.
(Continued)

*Primary Examiner* — Chi Q Nguyen
(74) *Attorney, Agent, or Firm* — Emerson, Thomson & Bennett, LLC; Roger D. Emerson; Peter R. Detorre

(57) ABSTRACT

A floor panel includes at least two reinforcing layers extending in a direction parallel to a plane defined by the panel to allow one of the at least two reinforcing layers to be situated at a level between 30~70 percent of a thickness from a top surface of the panel to a highest part of a top surface of the tongue, and/or a bottom surface of the panel to a lowest part of an upper surface of the lower lip.

12 Claims, 3 Drawing Sheets

(51) Int. Cl.
　　*E04F 15/02* (2006.01)
　　*E04F 15/08* (2006.01)
　　*B32B 7/04* (2019.01)
　　*B32B 13/02* (2006.01)
　　*B32B 3/06* (2006.01)
　　*E04F 13/14* (2006.01)

(52) U.S. Cl.
　　CPC ... *B32B 2607/02* (2013.01); *E04F 2201/0107* (2013.01); *E04F 2201/0153* (2013.01); *E04F 2201/0523* (2013.01)

(56) References Cited

U.S. PATENT DOCUMENTS

| | | | | |
|---|---|---|---|---|
| 3,931,428 | A * | 1/1976 | Reick | C08J 9/42 428/149 |
| 4,278,728 | A * | 7/1981 | Honda | B05D 7/546 442/226 |
| 5,336,551 | A * | 8/1994 | Graiver | C08J 5/04 428/137 |
| 5,631,053 | A * | 5/1997 | Andersen | B65D 43/162 428/36.4 |
| 6,688,061 | B2 | 2/2004 | Garcia | |
| 7,255,907 | B2 | 8/2007 | Feigin et al. | |
| 7,866,103 | B2 * | 1/2011 | Marschke | E04C 2/292 52/309.4 |
| 7,918,062 | B2 | 4/2011 | Chen | |
| 2003/0233809 | A1 * | 12/2003 | Pervan | B32B 21/00 52/783.1 |
| 2005/0286397 | A1 * | 12/2005 | Inagaki | B29B 17/0042 369/272.1 |
| 2006/0115442 | A1 * | 6/2006 | Katz | A61K 8/8111 424/70.11 |
| 2008/0149137 | A1 * | 6/2008 | Steinbrenner | C08J 9/40 134/8 |
| 2008/0318004 | A1 * | 12/2008 | Ruhe | D04H 1/54 428/171 |
| 2009/0011279 | A1 | 1/2009 | Wisenbaker, Jr. et al. | |
| 2009/0235607 | A1 | 9/2009 | Chen | |
| 2009/0308001 | A1 * | 12/2009 | Wu | F24S 20/66 52/173.3 |
| 2010/0115974 | A1 * | 5/2010 | Okaza | F25B 25/005 62/115 |
| 2011/0067336 | A1 * | 3/2011 | McDonald | B32B 25/14 52/506.01 |
| 2013/0295346 | A1 * | 11/2013 | Ferguson | B29C 63/48 428/196 |
| 2014/0087156 | A1 * | 3/2014 | Sarkis | C09D 5/02 428/212 |
| 2014/0134402 | A1 | 5/2014 | Pallon | |
| 2014/0272302 | A1 * | 9/2014 | Ciuperca | E04F 13/02 428/150 |
| 2015/0121793 | A1 * | 5/2015 | Segaert | B32B 27/304 52/506.01 |
| 2016/0214395 | A1 * | 7/2016 | Torfs | B41J 2/2107 |
| 2016/0369507 | A1 * | 12/2016 | Pervan | B32B 13/06 |
| 2017/0204616 | A1 | 7/2017 | Scholz | |
| 2017/0217133 | A1 | 8/2017 | Jordan et al. | |
| 2018/0283014 | A1 | 10/2018 | Hodgkins et al. | |
| 2019/0292793 | A1 * | 9/2019 | Van Vlassenrode | B32B 5/245 |
| 2019/0383031 | A1 * | 12/2019 | Baert | B32B 27/304 |
| 2020/0123788 | A1 * | 4/2020 | Baert | B32B 7/12 |
| 2020/0131784 | A1 * | 4/2020 | Boucke | E04F 13/0894 |
| 2020/0207118 | A1 * | 7/2020 | Lenaerts | C09D 11/324 |
| 2020/0218415 | A1 * | 7/2020 | Jang | G06N 20/00 |
| 2020/0282589 | A1 * | 9/2020 | Josefsson | E04F 15/10 |
| 2020/0308846 | A1 * | 10/2020 | Josefsson | E04F 15/02033 |

FOREIGN PATENT DOCUMENTS

| | | |
|---|---|---|
| EP | 2060389 | 5/2009 |
| EP | 3536874 | 9/2019 |
| JP | H0828015 | 1/1996 |
| KR | 20140066086 | 5/2014 |
| SE | 19503648 | 3/2019 |
| WO | 2012061300 | 5/2012 |
| WO | 2012061300 A2 | 5/2012 |
| WO | 2014007738 | 1/2014 |
| WO | 2019064113 A1 | 4/2019 |
| WO | 2020197475 | 10/2020 |

OTHER PUBLICATIONS

International Search Report and Written Opinion of corresponding Application No. NL 2025119 dated Jan. 14, 2021.

International Search Report and Written Opinion of corresponding PCT Application No. NL2025684, dated Mar. 3, 2021.

* cited by examiner

PANEL AND METHOD OF PRODUCING SUCH A PANEL

CROSS REFERENCE TO RELATED APPLICATIONS

N/A

BACKGROUND OF THE INVENTION

1. Field of the Invention

The invention relates to a panel, in particular a floor panel, a wall panel, or a ceiling panel.

2. Description of Related Art

In the field of floor and wall coverings, panels based on wood materials or derivatives thereof are widely used as material for the main or core layer of the panel. An example is given in U.S. Pat. No. 6,688,061. Major disadvantages of such panels are the hygroscopic nature of such wood-based materials, which affects the lifetime and durability of such panels; and the flammability of wood-based products. As an alternative, several thermoplastic materials can be used, such as polyvinyl chloride, which while being water resistant, present other disadvantages. Polyvinyl chloride (PVC) that is used for panels such as in patent CN 100419019, has a flexible quality. This requires a perfectly smooth and even surface of the substrate on which the panel covering is applied. If such is not the case, any unevenness will be visible through the panel as it conforms with the underlying substrate surface, which is a detrimental effect from an aesthetic point of view to the user. Furthermore, a floor panel using PVC as core material is susceptible to temperature changes in its ambient environment which will cause the vinyl flooring to expand and contract with hot and cold fluctuations. PVC panels also generally do not pass fireproofing ASTM tests.

There is clearly a general need in the field to develop a floor panel which while having waterproof and temperature-proof properties, can be produced with a relatively high bending strength leading to a relatively even (flat) upper surface. There is also a need in the field to develop a floor panel of which the thickness can be adjusted relatively easily during production, while maintaining sufficient strength of the panel. There is furthermore a need to develop a fireproof panel to allow these panels to be used in commercial environments.

It is known to use wall panels with a mineral based or cementitious material based core to reach fireproofing standards. However, despite the advantages these materials offer with respect to wood or thermoplastic materials, reinforcement layers that that are applied for reasons of dimensional stability, have an impact on their performance in various strength tests that are applicable to flooring.

In particular floor panels with a core based on a mineral or cementitious material such as gypsum or magnesium can comprise a reinforcing layer of fiberglass, polypropylene, nylon and the like, as is described for construction boards in U.S. Pat. No. 7,255,907, and for stone-wood flooring in WO2012061300.

These mineral panels, when combined with a reinforcing layer as described in the prior art, cannot feature a lockable tongue and groove connection at opposite edges of the panel to serve as part of a floating floor with interlocking coupling parts to prevent both horizontal as vertical movement. When combining this type of floor panel with a reinforcing layer of fiberglass, the structural integrity is weakened, resulting in fractures when engaging the lock and when put into its intended use, and in failure when tested to "ISO 4918 Resilient, textile and laminate floor coverings—Castor chair test". Hence, existing art attempts to solve this through non-locking profiles with an insert as in US20170204616, a non-locking tongue and groove on adjacent sides as in US2011058611, or simply do not touch upon the technical problem presented in this invention, as in EP2060389.

SUMMARY OF THE INVENTION

It is therefore an objective of the invention to provide a panel with a mineral based or cementitious material based core, lacking at least part of the disadvantages of prior art panels.

The invention thereto proposes a panel, in particular a floor panel, a wall panel, or a ceiling panel, comprising a core layer, comprising a mineral or a cementitious material; at least one reinforcing layer situated in said core layer; wherein the panel, in particular the core layer, comprises a first pair of opposite edges, wherein a first edge of said first pair of opposing edges comprises a first coupling part, and wherein a second edge of said first pair of opposing edges comprises a complementary second coupling part, said coupling parts allowing a plurality of panels to be mutually coupled; wherein the first coupling part comprises a sideward tongue extending in a direction substantially parallel to a plane defined by the panel, and wherein the second coupling part comprises a groove configured for accommodating at least a part of the sideward tongue of another panel, said groove being defined by an upper lip and a lower lip, wherein at least one reinforcing layer extends in a direction substantially parallel to the plane defined by the panel, such that said reinforcing layer is situated at a level between 30 and 70 percent, more in particular between 40 and 60 percent, and preferably halfway, of the thickness from the top surface of the panel to a highest part of the top surface of the tongue, and/or the bottom surface of the panel to a lowest part of the upper surface of the lower lip.

Experimentation with different locations of a reinforcing layer within the structure of both tongue and groove gives conclusive evidence for optimal strengthening of the locking system, whilst maintaining structural integrity. The panel according to the present application meets industry standards on structural integrity, while the locking system is durable and does not easily break.

The invention also relates to a (floor) panel, comprising a core layer, comprising a mineral or a cementitious material, at least one reinforcing element situated in said core layer, wherein the floor panel, in particular the core layer, comprises a first pair of opposite edges, said first pair of opposite edges comprising interlocking coupling parts allowing to mutually couple of plurality of floor panels to each other, wherein the interlocking coupling parts are formed as a tongue and a groove by local removal of material at the respective edge, and wherein the at least one reinforcing element is situated in the laminate, at a level between 30 and 70 percent, more in particular between 40 and 60 percent, and preferably halfway the smallest thickness of the remaining core layer material at the location of the tongue or the groove. Interlocking coupling parts are coupling parts that require elastic deformation, a click or a movement in multiple directions to couple or decouple the parts with or from each other.

It is also conceivable that the panel comprises at least two reinforcing layers extends in a direction substantially parallel to the plane defined by the panel, such that each reinforcing layer is situated at a level between 30 and 70 percent, in particular between 40 and 60 percent, and preferably halfway, of the thickness from the top surface of the panel to a highest part of the top surface of the tongue, and/or the bottom surface of the panel to a lowest part of the upper surface of the lower lip, and wherein adjacent reinforcing layers are positioned at a predetermined distance from another. Preferably, there is no direct contact between said at least two reinforcing layers.

In an embodiment, the floor panel according to the invention comprises at least two reinforcing layers, wherein a first of the reinforcing layers is situated in the laminate, at a level between 30 and 70 percent, more in particular between 40 and 60 percent, and preferably halfway the smallest thickness of the remaining material at the location of the tongue, and wherein the second of the reinforcing layers is situated in the laminate, at a level between 30 and 70 percent, more in particular between 40 and 60 percent, and preferably halfway the smallest thickness of the remaining material at the location of the groove. In this embodiment, both tongue and groove are further optimised, leading to an even more stable panel, with a very low damage and wear risk.

The reinforcing layer may be a separate part, inserted in the panel, it may be a part of the same material with different properties, such as a different density or different material structure, or it may be a layer in the laminate. Such reinforcing layer may be a closed layer or a mesh, sheet, or web material, that may be integrated or embedded in the core layer, especially when the core layer is made from a fluid or semi fluid material that requires curing.

In general, the core layer has a top surface and a bottom surface, and in an embodiment, the remaining material at the location of the tongue or the groove extends to the top surface and a bottom surface. That means, when removing material for forming the tongue or the groove, only one side of the panel needs to be edited.

When the complementary coupling parts are intended for forming a click, or need to bend in order to couple or to snap, it is preferable when at least one reinforcing layer has a flexibility that is higher than the flexibility of the core material and/or the core layer. Suitable materials to be applied as layer for the reinforcing layer for this purpose are fiberglass, polypropylene, cotton, silica or nylon.

These materials may be combined with a core layer comprising or consisting of MgO and/or Magnesium Oxy Chloride cement and/or, Magnesium Oxy Sulphate cement and/or MgCl2 and/or MgSO4, and a suitable binder. In a practical embodiment, the core layer may comprise at least 70% in weight of MgO and/or Magnesium Oxy Chloride cement and/or, Magnesium Oxy Sulfate cement and/or MgCl2 and/or MgSO4, and a binder.

The core layer may for instance have a thickness between 3 and 8, in particular between 5 and 6 mm, wherein the smallest thickness of the tongue or groove is between 1 and 3 mm.

It is conceivable that the complementary coupling parts (or interlocking coupling parts) are configured to form a click connection.

The (floor) panel according to the invention may comprise a laminate of said core layer and at least one of a decorative top layer, an acoustic dampening layer and/or a balancing layer. A decorative top layer, if applied, may for example comprise at least one ply of cellulose-based layer and a cured resin, wherein the cellulose-based layer is preferably paper or kraft paper. Said ply of cellulose-based material may also be a veneer layer adhered to a top surface of the core layer. The veneer layer is preferably selected from the group consisting of wood veneer, cork veneer, bamboo veneer, and the like. Other decorative top layers that could possibly be applied for the present invention include a ceramic tile, a porcelain tile, a real stone veneer, a rubber veneer, a decorative plastic or vinyl, linoleum, and decorative thermoplastic film or foil. The top layer may possibly be further provided with a wear layer and optionally a coating. Examples of thermoplastics which could be used in such top layer are PP, PET, PVC and the like. It is also possible to provide on the top facing surface of the core layer an optional primer and print the desired visual effect in a direct printing process. The decorative top layer can receive a further finishing with a thermosetting varnish or lacquer such as polyurethane, PUR, or a melamine based resin. It is also conceivable that the panel comprises (at its back surface) at least one balancing layer, generally composed of at least one layer comprising lignocellulose and a cured resin. The panel may also comprise at least one acoustic layer, usually composed of a low density foamed layer of ethylene-vinyl acetate (EVA), irradiation-crosslinked polyethylene (IXPE), expanded polypropylene (XPP), expanded polystyrene (XPS), but also nonwoven fibers such as made from natural fibers like hemp or cork, or recycled/recyclable material such as PET. The density of this acoustic layer preferably has a density between 65 kg/m3 and 300 kg/m3, most preferably between 80 kg/m3 and 150 kgm3.

Tests were performed with two different panel compositions, and reinforcing layers (in the form of a layer of the laminate, comprising fibreglass) at different locations. The first panel has a core comprising Magnesium Oxy Chloride cement (MOC), and the second panel comprises a core comprising Magnesium Oxy Sulfate cement (MOS).

Table 1 shows the characteristics of various tested panels, in particular floor panels.

TABLE 1 characteristics of various tested panels.

| Type | Name | Material | Thickness | Tongue thickness | Fiberglass height |
|---|---|---|---|---|---|
| Core | A - Tongue-2 | MOC | 5.4 mm | 2.2 mm | 2 mm |
|  | B - Tongue-0.5 | MOS | 5.4 mm | 2.2 mm | 0.5 mm |
|  | B - Tongue-1.1 | MOS | 5.4 mm | 2.2 mm | 1.1 mm |
|  | B - Groove-0.65 | MOS | 5.4 mm | 1.3 mm | 0.65 mm |
|  | A - Groove-1 | MOC | 5.4 mm | 1.3 mm | 1 mm |
|  | B - Groove-1.3 | MOS | 5.4 mm | 1.3 mm | 1.3 mm |

All (floor) panels were tested according to standardised tests mentioned in table 2.

TABLE 2 tests performed

| Code | Requirement | Description |
|---|---|---|
| EN 310 | N/A | Yield strength (point of breakage) |
| ISO 4918 | 10,000R | Castor chair - Residential applications |
|  | 25,000R | Castor chair - Commercial applications |

The test results for the panels from table 1 are shown in table 3.

TABLE 3

| | test results | |
|---|---|---|
| Sample | EN 310 | ISO 4918 |
| A - Tongue-2 | 217N/100 mm | 8,000R |
| B - Tongue-0.5 | 221N/100 mm | 15,000R |
| B - Tongue-1.1 | 340N/100 mm | 25,000R |
| B - Groove-0.65 | 311N/100 mm | 25,000R |
| A - Groove-1 | 191N/100 mm | 15,000R |
| B - Groove-1.3 | 162n/100 mm | 6,000R |

From the results it appears that the at least one reinforcing layer is best situated in the laminate, at a level between 30 and 70 percent, more in particular between 40 and 60 percent, and preferably halfway the smallest thickness of the remaining core layer material at the location of the tongue or the groove.

BRIEF DESCRIPTION OF THE DRAWINGS

The invention will now be elucidated into more detail with reference to the following figures:

FIG. 1 shows two sides of a panel 1, in particular a floor panel 1, comprising a core layer 2, comprising a mineral or a cementitious material, at least one reinforcing layer 6, 7 situated in said core layer, wherein the floor panel, in particular the core layer, comprises a first pair of opposite edges, said first pair of opposite edges comprising interlocking coupling parts allowing to mutually couple of plurality of floor panels to each other, wherein the interlocking coupling parts are formed as a tongue 9 and a groove 3 by local removal of material at the respective edge. Further, the reinforcing layers 6, 7 extends in a direction substantially parallel to the plane defined by the panel, such that said reinforcing layer is situated at a level between 30 and 70 percent, more in particular between 40 and 60 percent, and preferably halfway, of the thickness from the top surface of the panel to a highest part of the top surface of the tongue, and/or the bottom surface of the panel to a lowest part of the upper surface of the lower lip. In particular, each reinforcing layer 6, 7, is situated halfway the smallest thickness 4, 5 of the remaining core layer material at the location of the tongue or the groove. The core has a top surface 9 and a bottom surface 8, and the remaining material at the location of the tongue or the groove extends to the top surface or the bottom surface.

FIG. 2 shows two sides of a panel 21, in particular a floor panel 21, comprising a core layer 22, comprising a mineral or a cementitious material, at least one reinforcing layer 26, 27 situated in said core layer, wherein the floor panel, in particular the core layer, comprises a first pair of opposite edges, said first pair of opposite edges comprising interlocking coupling parts allowing to mutually couple of plurality of floor panels to each other, wherein the interlocking coupling parts are formed as a tongue 290 and a groove 23 by local removal of material at the respective edge. The reinforcing layer 26, 27, is situated halfway the smallest thickness 24, 25 of the remaining core layer material at the location of the tongue or the groove. The core has a top surface 29 and a bottom surface 28, and the remaining material at the location of the tongue or the groove extends to the top surface or the bottom surface.

FIG. 3 shows two sides of a panel 31, in particular a floor panel 31, comprising a core layer 32, comprising a mineral or a cementitious material, at least one reinforcing layer 36, 37 situated in said core layer, wherein the floor panel, in particular the core layer, comprises a first pair of opposite edges, said first pair of opposite edges comprising interlocking coupling parts allowing to mutually couple of plurality of floor panels to each other, wherein the interlocking coupling parts are formed as a tongue 390 and a groove 33 by local removal of material at the respective edge. The reinforcing layer 36, 37, is situated halfway the smallest thickness 34, 35 of the remaining core layer material at the location of the tongue or the groove. The core has a top surface 39 and a bottom surface 38, and the remaining material at the location of the tongue or the groove extends to the top surface or the bottom surface.

FIG. 4 shows two sides of a panel 41, in particular a floor panel 41, comprising a core layer 42, comprising a mineral or a cementitious material, at least one reinforcing layer 46, 47 situated in said core layer, wherein the floor panel, in particular the core layer, comprises a first pair of opposite edges, said first pair of opposite edges comprising interlocking coupling parts allowing to mutually couple of plurality of floor panels to each other, wherein the interlocking coupling parts are formed as a tongue 490 and a groove 43 by local removal of material at the respective edge. The reinforcing layer 46, 47, is situated halfway the smallest thickness 44, 45 of the remaining core layer material at the location of the tongue or the groove. The core has a top surface 49 and a bottom surface 48, and the remaining material at the location of the tongue or the groove extends to the top surface or the bottom surface.

FIG. 5 shows two sides of a panel 51, in particular a floor panel 51, comprising a core layer 52, comprising a mineral or a cementitious material, at least one reinforcing layer 56, 57 situated in said core layer, wherein the panel, in particular the core layer, comprises a first pair of opposite edges, said first pair of opposite edges comprising interlocking coupling parts allowing to mutually couple of plurality of panels to each other, wherein the interlocking coupling parts are formed as a tongue 590 and a groove 53 by local removal of material at the respective edge. The reinforcing layer 56, 57, is situated halfway the smallest thickness 54, 55 of the remaining core layer material at the location of the tongue or the groove. The core layer has a top surface 59 and a bottom surface 58, and the remaining material at the location of the tongue or the groove extends to the top surface or the bottom surface.

Figure 1:
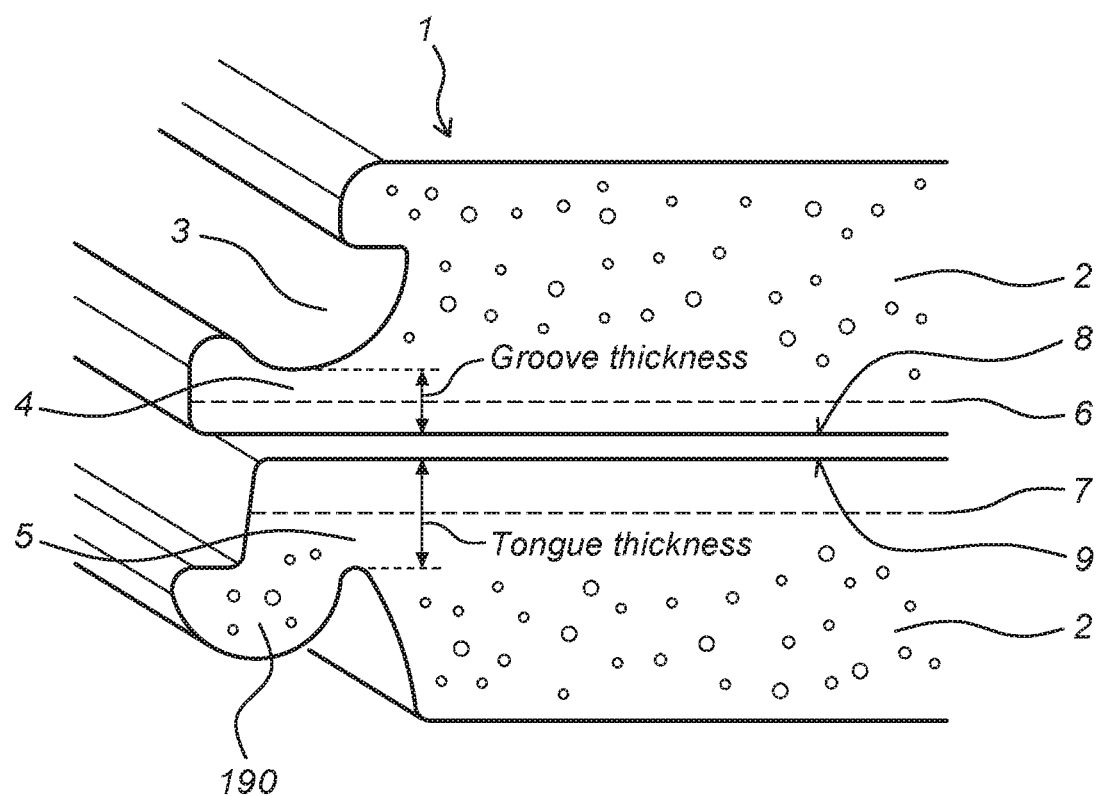
FIG. 1, showing a core of a panel according to the present invention.
Figure 2:
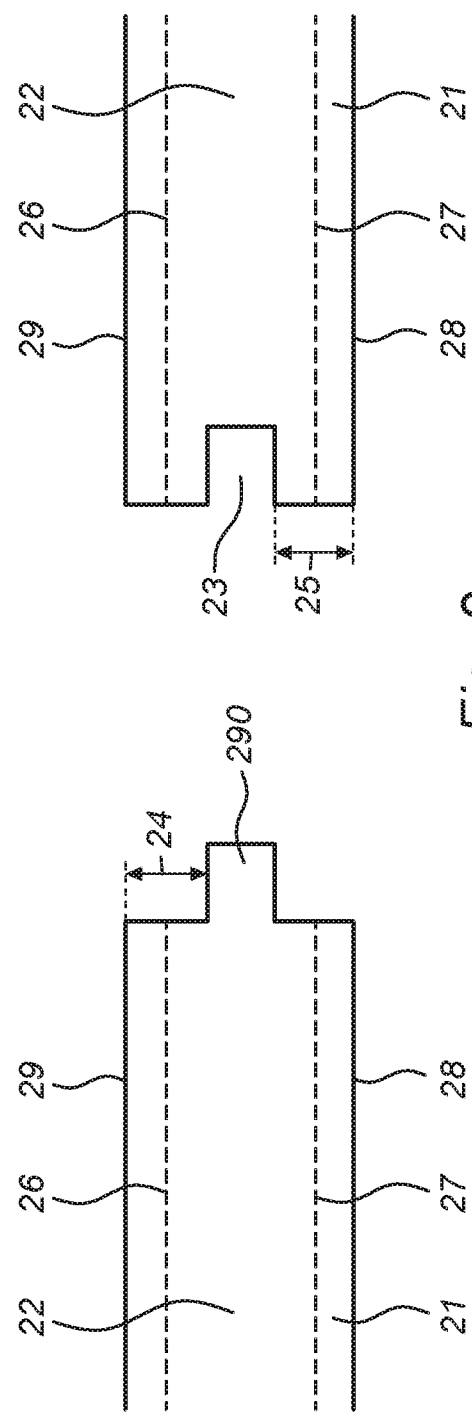
FIG. 2, showing a core of a panel according to the present invention.
Figure 3:
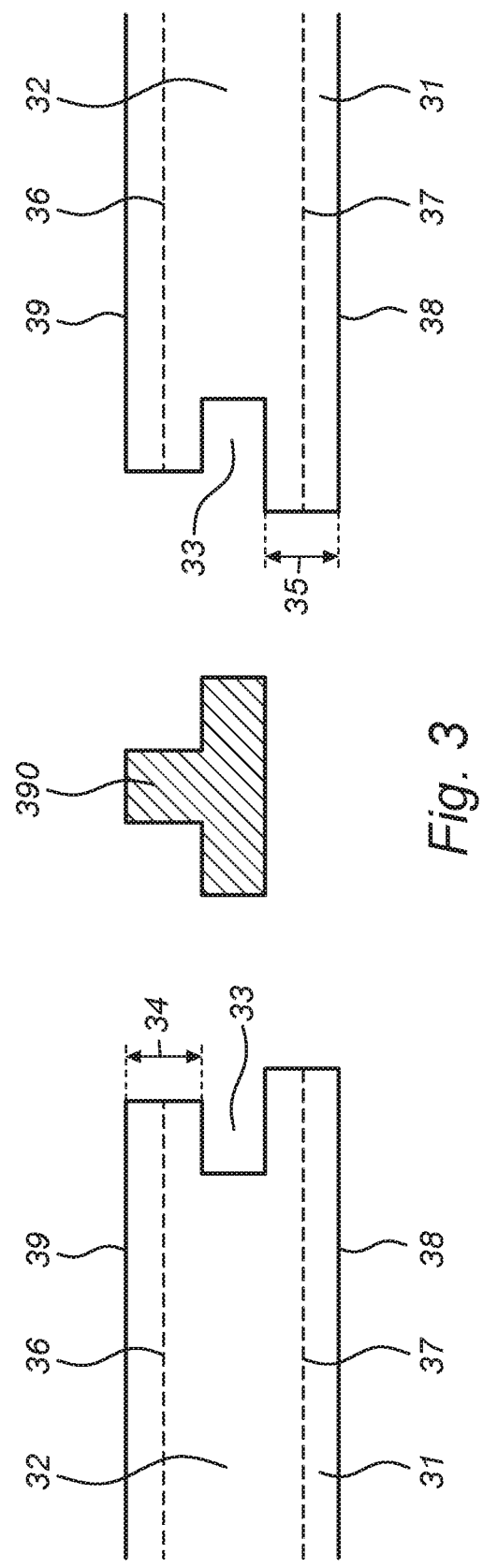
FIG. 3, showing a core of a panel according to the present invention.
Figure 4:
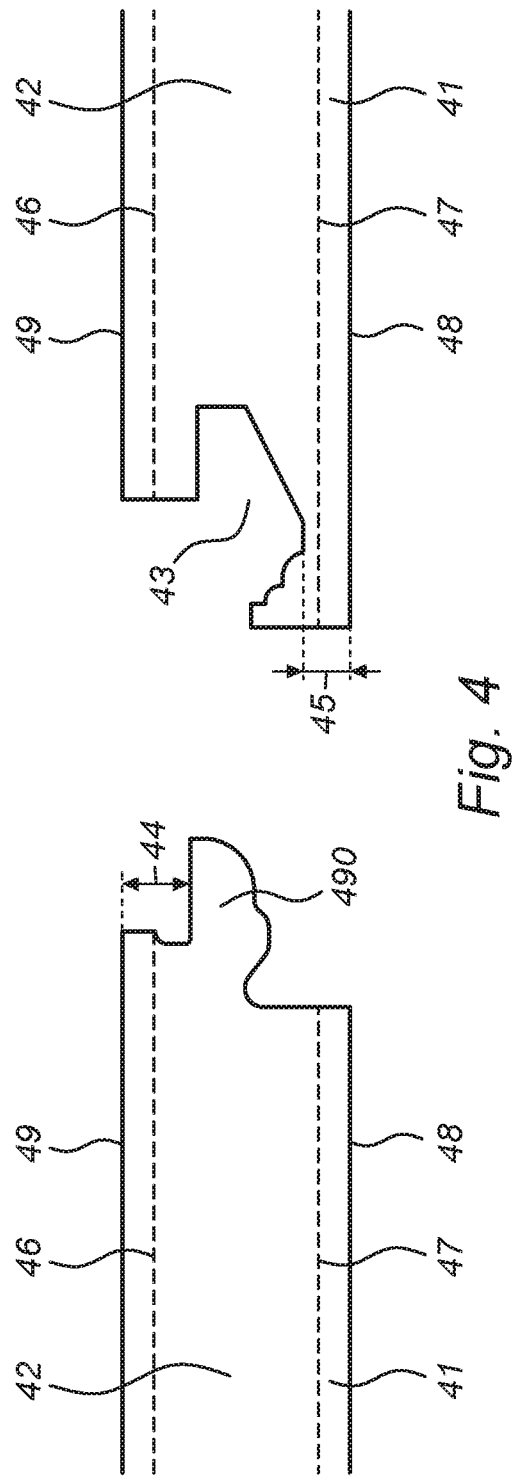
FIG. 4, showing a core of a panel according to the present invention.
Figure 5:
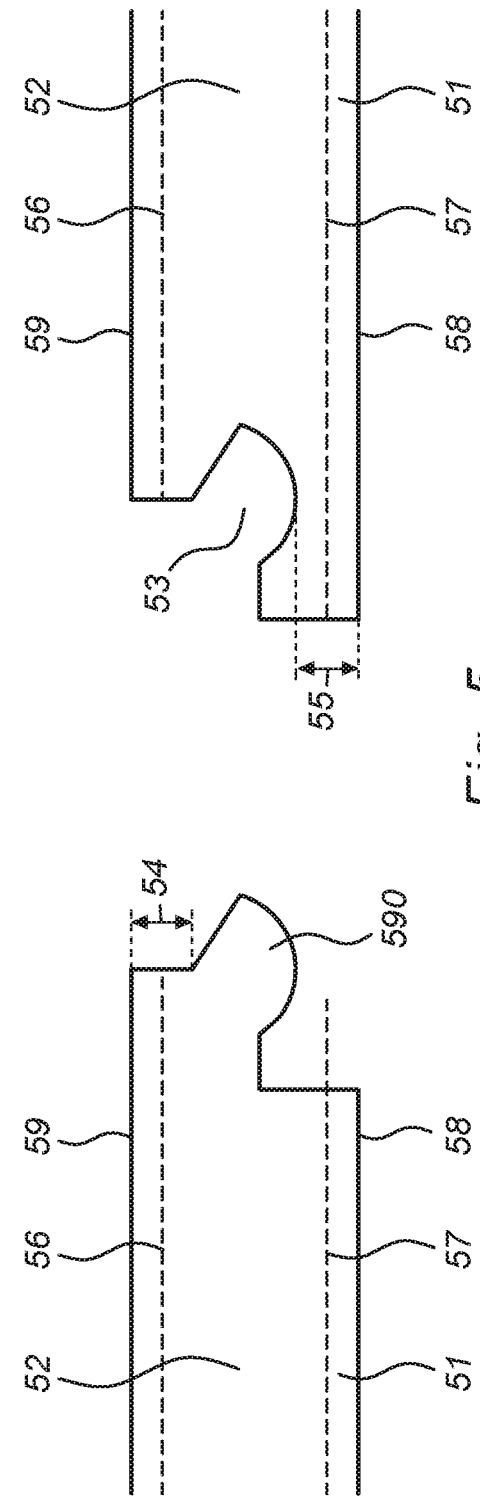
FIG. 5, showing a core of a panel according to the present invention.

Despite the figures showing embodiment comprising two reinforcing layers, it is also conceivable that a panel comprises one reinforcing layer, three reinforcing layers or any other number of reinforcing layers. However, preferably for all embodiments, at least one the reinforcing layer extends in a direction substantially parallel to the plane defined by the panel, such that said reinforcing layer is situated at a level between 30 and 70 percent, more in particular between 40 and 60 percent, and preferably halfway, of the thickness from the top surface of the panel to a highest part of the top surface of the tongue, and/or the bottom surface of the panel to a lowest part of the upper surface of the lower lip.

It will be apparent that the invention is not limited to the working examples shown and described herein, but that numerous variants are possible within the scope of the attached claims that will be obvious to a person skilled in the art.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

The verb "comprise" and conjugations thereof used in this patent publication are understood to mean not only "comprise", but are also understood to mean the phrases "contain", "substantially consist of", "formed by" and conjugations thereof. When it is referred to reinforcing layer also a reinforcing element can be meant, or vice versa.

What is claimed is:

1. A panel comprising:
    a core layer, comprising a mineral or a cementitious material;
    at least two reinforcing layers situated in said core layer; wherein the core layer comprises at least 70% in weight of mineral or cementitious material, said core layer further comprising a first pair of opposite edges, wherein a first edge of said first pair of opposing edges comprises a first coupling part, and wherein a second edge of said first pair of opposing edges comprises a complementary second coupling part, said coupling parts allowing a plurality of panels to be mutually coupled;
    wherein the first coupling part comprises a sideward tongue extending in a direction substantially parallel to a plane defined by the panel, and wherein the second coupling part comprises a groove configured for accommodating at least a part of the sideward tongue of another panel, said groove being defined by an upper lip and a lower lip,
    wherein:
        the at least two reinforcing layers extend in a direction substantially parallel to the plane defined by the panel to allow one of the at least two reinforcing layers to be selectively situated at a level between 40 and 60 percent of a thickness from
            a top surface of the panel to a bottom surface of the tongue, and
            a bottom surface of the panel to an upper surface of the lower lip.

2. The panel according to claim 1, wherein there are two reinforcing layers and one of the at least two reinforcing layers is situated in the core at a level between between 40 and 60 percent of the thickness from the top surface of the core to the bottom surface of the tongue, or wherein the other one of the at least two reinforcing layers is situated in the core, extending parallel to the plane of the panel, at a level between 40 and 60 percent of the thickness from the bottom surface of the core to the top surface of the groove.

3. The panel according to claim 2, wherein the at least two reinforcing layers are selected from the group consisting of fiberglass, polypropylene, cotton, PET (polyethylene terephthalate), silica and nylon.

4. The panel according to claim 1, wherein at least one reinforcing layer comprises a mesh, sheet, or web material.

5. The panel according to claim 1, wherein the core layer comprises MgO, Magnesium Oxy Chloride, Magnesium Oxy Sulfate, $MgCl_2$, $MgSO_4$, and/or $MgCO_3$ or a binder.

6. The panel according to claim 5, wherein the core layer comprises at least 70% in weight of MgO, Magnesium Oxy Chloride, Magnesium Oxy Sulfate, $MgCl_2$, $MgSO_4$, $MgCO_3$ and a binder.

7. The panel according to claim 1, wherein the core layer has a thickness between 3 and 8 mm.

8. The panel according to claim 1, wherein the tongue and groove respectively have a thickness between 1 and 3 mm.

9. The panel according to claim 1, further comprising a laminate of said core layer and at least one of:
    a decorative top layer;
    an acoustic dampening layer; and
    a balancing layer.

10. The panel according to claim 1, wherein one of the at least two reinforcing layers is situated at a center of the core.

11. The panel as according to claim 1, wherein the core layer has a thickness between 5 mm-6 mm.

12. A floor panel, wall panel, or a ceiling panel comprising:
    a core layer, comprising a mineral or a cementitious material;
    at least two reinforcing layers situated in said core layer;
        wherein the core layer comprises a first pair of opposite edges, wherein a first edge of said first pair of opposing edges comprises a first coupling part, and wherein a second edge of said first pair of opposing edges comprises a complementary second coupling part, said coupling parts allowing a plurality of panels to be mutually coupled; wherein the first coupling part comprises a sideward tongue extending in a direction parallel to a plane defined by the panel, and wherein the second coupling part comprises a groove configured for accommodating at least a part of the sideward tongue of another panel, said groove being defined by an upper lip and a lower lip,
    wherein the at least two reinforcing layers extend in a direction parallel to a plane defined by the panel to allow the at least two reinforcing layers to be situated at a level between 30~70 percent of a thickness from:
        a top surface of the panel to a bottom surface of the tongue, and a bottom surface of the panel to an upper surface of the lower lip respectively.

* * * * *